(12) United States Patent
Vaddadi et al.

(10) Patent No.: US 12,710,928 B2
(45) Date of Patent: Aug. 18, 2026

(54) METHOD AND SYSTEM FOR IMPLEMENTING BINARY ARRAYS

(71) Applicants: Praveen Vaddadi, Hyderabad (IN); Praneeth Vaddadi, Hyderabad (IN)

(72) Inventors: Praveen Vaddadi, Hyderabad (IN); Praneeth Vaddadi, Hyderabad (IN)

( * ) Notice: Subject to any disclaimer, the term of this patent is extended or adjusted under 35 U.S.C. 154(b) by 589 days.

(21) Appl. No.: 18/106,681

(22) Filed: Feb. 7, 2023

(65) Prior Publication Data

US 2024/0152334 A1 May 9, 2024

(51) Int. Cl.
*G06F 8/30* (2018.01)

(52) U.S. Cl.
CPC .................................... *G06F 8/30* (2013.01)

(58) Field of Classification Search
CPC .................................. G06F 8/30; G06F 16/22
See application file for complete search history.

(56) References Cited

U.S. PATENT DOCUMENTS

2020/0357483 A1 * 11/2020 Roquet .................. G16B 50/50

OTHER PUBLICATIONS

Goemans,“Generating Functions”,Mar. 1, 2015, pp. GenFun-1 to GenFUn-17 (Year: 2015).*

* cited by examiner

*Primary Examiner* — Duy Khuong T Nguyen

(57) ABSTRACT

In one aspect, a computerized method includes the step of obtaining a binary array, wherein the binary array is utilized for a subsequent set of operations. The method includes the step of performing a dissolution coding on the binary array to yield a one or more generating functions. The method includes the step of codifying the one or more generating functions as a branch-free program to yield an optimal packing of the binary array.

20 Claims, 14 Drawing Sheets

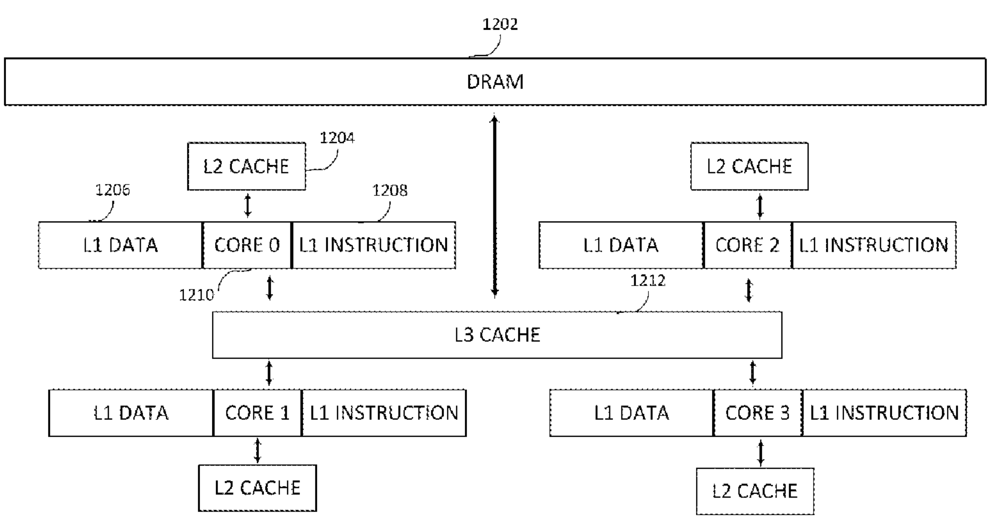
FIGURE 12

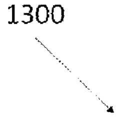
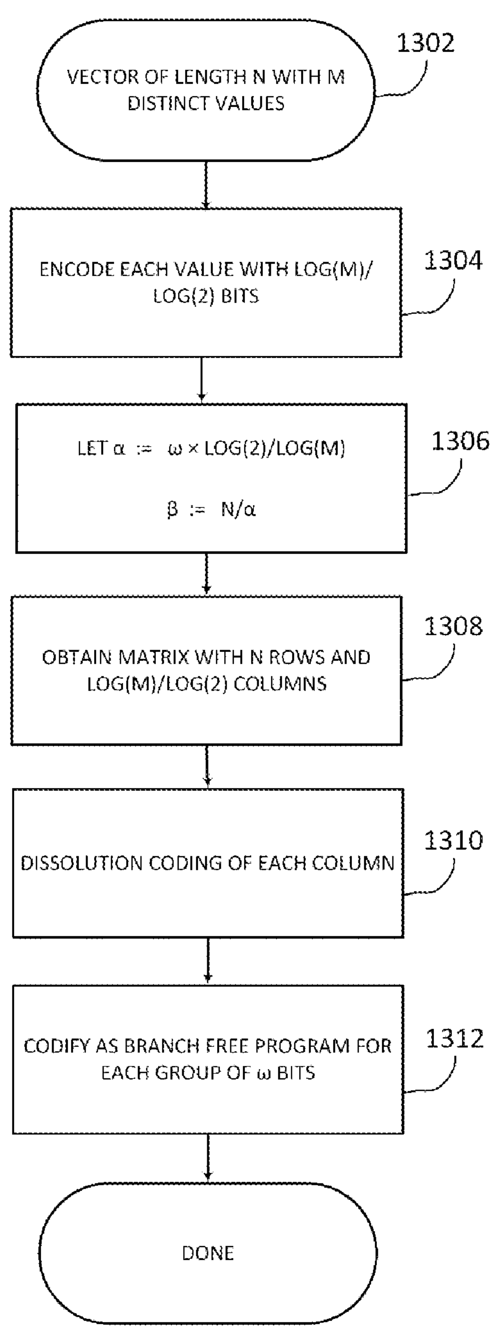
FIGURE 13

REDUCE THE COST OF ACCESSING BINARY ARRAYS
1402

PROVIDE EFFICIENT REPRESENTATION OF BINARY ARRAYS CONSUMING LESS MEMORY BANDWIDTH
1404

PROVIDE EFFICIENT REPRESENTATION OF BINARY ARRAYS THAT CAN EFFICIENTLY PERFORM BITWISE LOGICAL OPERATIONS
1406

AVOID EXPENSIVE PRE-PROCESSING ON LARGE BINARY ARRAYS FOR EFFICIENT COMPRESSION
1408

MAXIMIZE MEMORY THROUGHPUT IN EXPENSIVE CALCULATIONS INVOLVING LARGE BINARY ARRAYS
1410

PROVIDE A MEMORY, TIME AND COMPUTE EFFICIENT BINARY ARRAY REPRESENTATION FOR LOW-END OR EMBEDDED PROCESSORS
1412

PROVIDE A REPRESENTATION FOR BINARY ARRAYS THAT IS AMENABLE FOR EFFICIENT DISTRIBUTED OR PARALLEL COMPUTING
1414

PROVIDE AN EASILY EXTENDIBLE EFFICIENT REPRESENTATION METHOD THAT IS ALSO APPLICABLE TO NON-BINARY ARRAY
1416

ENABLE BINARY ARRAY TO BE USED IN COMBINATION WITH EXISTING COMPRESSION TECHNIQUES
1418

FIGURE 14

METHOD AND SYSTEM FOR IMPLEMENTING BINARY ARRAYS

CLAIM OF PRIORITY

This application claims priority under Article 4A of the Paris Convention for the Protection of Industrial Property to Indian Patent Application No. 202241063365, filed on Nov. 7, 2022 and titled METHOD AND SYSTEM FOR IMPLEMENTING BINARY ARRAYS.

BACKGROUND

In recent years, there has been an increased interest in mining and operating large datasets. The rate of growth of large dataset sizes is enormous. Applications like video conferencing and telephony, neural networks, interactive visualization systems, ecommerce, etc. require large amounts of bandwidth and computing power.

Persistent data underpins almost every corporate application. The data contained inside an application is sometimes worth much more to its users than the program itself. Many systems devote the bulk of their energy on establishing and maintaining data access details and logistics. As a result, it is critical to thoroughly understand both the structure of the data and the interactions of the application with it in order to optimize both for efficiency and maintainability. Most of the time, programmers and designers are not permitted to alter or modify current data models. Changing a data model element from one software release to the next may need complex table conversion operations that impair an enterprise's computing infrastructure during an update. Data access pattern optimizations are a lot more viable option, as implementation improvements involve only the installation of new software. Data access operations can easily be the most expensive in an entire enterprise system. The gap between streamlined, transparent throughput and delayed reaction times is determined by naive or wasteful data access patterns. As a result, when examining large optimizations, data access patterns are an excellent option to target.

Although there has been a tremendous improvement in transmission technologies and bandwidth is getting cheaper, there still exists a need to code the information in an efficient way, thereby reducing bandwidth and access costs and improving compute efficiency. Modern microprocessors offer a rich memory hierarchy including various levels of cache and registers. Some of these memories (like main memory, L3 cache) are big but slow and shared among all cores. Others (registers, L1 cache) are fast and exclusively assigned to a single core but small. Only if the data accesses have a high locality, then excessive data transfers between the memory hierarchy may be avoided.

Consider the following problems, inter alia:

- A large dataset describing various relationships among purchases people make in an ecommerce website and one would like to infer various association rules from it;
- A deep-neural network with a large model size (e.g. greater than 600 MB) and computing requirements (e.g. greater than 16 GFLOPS);
- A large graph database of various phone numbers that tells us which numbers call which numbers and one would like to develop models of cliques of interest;
- A large and complex database of three-dimensional geometric cells neighboring a location for real-time visualization (e.g., maps, 3D worlds in games, etc.);
- A large database of mouse positions, clicks, ad-locations, and other advertisement and user browsing behavior patterns;
- Very large bitmap indices for various attribute queries maintained by database systems;
- Very large binary matrices pertaining to spectral graph theory, weblink analysis; compressed sensing, etc.; and
- Very large datasets used by traffic archiving and network monitoring systems, with high volumes of internet traffic flow and packet records, etc.

In all the above problems, the basic unit of data is a large array of zeros and ones (binary arrays). Matrix multiplication, factorization, and other computational kernels in the above problems account for a big part of the cost (bandwidth, transmission and compute). Such large matrices span millions of rows and columns. Thousands of bitmap indices with millions of entries need to be stored for efficient bitwise operations on them (such instances appear in complex database queries). Employing very deep neural networks results in long inference times and computational redundancy.

An example solution to all the above-mentioned problems is to store binary matrices in a compressed format to reduce memory overhead and improve computational efficiency. However, this comes with a trade-off: though the kernel computation is optimized, the transfer costs are very high. The transfer of data (memory traffic) between host (CPU/memory) and device (CPU/GPU) consumes a lot of processing time for large binary arrays. Additionally, these requirements limit the expansion of such large data applications into low-end or embedded processors.

To give a performance boost for data analysis on such large datasets (or databases), the cost of accessing such large binary arrays should also be minimized, while efficiently encoding the binary matrices for space and computational time. Designing an efficient time and space efficient scalable storage and access mechanisms for such large binary arrays is a challenging problem. The example embodiment is aimed at solving this problem. The example embodiment relates to encoding and decoding of values and binary arrays, and methods thereof.

Various binary array compression (either lossy or lossless) methods like BBC, WAH, Run Length Encoding (RLE), CONCISE, COMPAX, Roaring Bitmaps, PLWAH, MASC, LZW, LZMA, JPEG, BWT, PPM, PPMII, LZ77, Huffman Coding, MTF, CM, DM, DMC, Bit Reduction Quantization, etc. have been proposed that employ a combination of a plurality of techniques, including, inter alia: segmenting, bit chunking, symbol fusion, near identical marking, and sorting.

Almost all compression methods are extended from run length encoding (RLE), by employing various said techniques above. Methods like BBC, WAH [U.S. Pat. No. 6,831,575B2], PLWAH, EWAH, etc. use byte (or word) aligned chunks of run length encoded values, with additional encodings for nearly identical markings (and/or position lists) to enrich the codewords. Some methods like MASC, COMPAX, etc. additionally segment the input binary array into various runs and fuse together two (or three) symbols while encoding.

A symbol is either a word of mixed bits or a word of all ones or zeros. The near identical markings of symbols are encoded by a few bits called control bits. Some compression methods may warrant a reordering of the binary arrays and/or a segmentation of binary arrays (e.g., hierarchical segmentation like a tree encoding, using statistical inference to identify lumps/clusters of zeros or ones, etc.) for improved efficacy.

Many RLE based methods like WAH, PLWAH, COMPAX, EWAH, etc., lack capability to perform efficient bitwise logical operations like AND, XOR, OR, etc., that are critical for fast database query processing. Roaring Bitmaps, a binary array compression method, excels in such operations. Roaring bitmaps doesn't aim for optimal compression and decompresses only the required parts. Its hybrid compression scheme employs sorting as its core technique: It maintains a sorted array of values and only compresses values that go beyond the array size. Using a sorted array helps in fast searches.

Roaring Bitmaps are optimized for indexing binary arrays to enable fast logical operations like AND, XOR, OR, etc., and thus trade space for performance (index lookups, etc.). Other methods like WAH, PLWAH, etc., though achieving near optimal compressions suffer from performance (index lookups, kernel computations) and heavy memory traffic (between host like memory/CPU and device like CPU/GPU) issues. With increasing sizes of binary matrices, such performance and memory trade-offs made by these methods prohibit their applications in both low-end or embedded processors and high-end computing systems with limited memory bandwidths.

A requirement thus exists for a method that lies in the Pareto Frontier of three requirements: small access time, high compression and efficient computability (computational performance). This method, in its various embodiments, yields various applications that provide optimum performance, compression and access time for large datasets.

Unlike the prior art, an example method does not employ run length encoding approach; allows fast bitwise AND, OR, XOR, etc., operations; reduces memory traffic; can be used in combination with existing techniques; does not require expensive reordering or statistical inference methods; can also be used in low-end or embedded processor environments and works effectively for both sparse and dense binary arrays.

Unlike the prior art, an example method does not rely on efficiently packing binary values into successive machine words (or chunks of 31 or 63 bits, etc.) with codewords. Instead, the binary array is represented by an easily computable generating function that is codified using a machine executable branch-free program. Unlike the prior art, an example method, with trivial extensions, is applicable to non-binary arrays as well.

SUMMARY OF THE INVENTION

In one aspect, a computerized method includes the step of obtaining a binary array, wherein the binary array is utilized for a subsequent set of operations. The method includes the step of performing a dissolution coding on the binary array to yield a one or more generating functions. The method includes the step of codifying the one or more generating functions as a branch-free program to yield an optimal packing of the binary array.

BRIEF DESCRIPTION OF THE DRAWINGS

The present application can be best understood by reference to the following description taken in conjunction with the accompanying figures, in which like parts may be referred to by like numerals.

FIG. 12 is a block diagram illustrating memory layout of a typical multicore processor.

FIG. 13 is a flowchart illustrating one alternative embodiment relating to present invention.

FIG. 14 illustrates an example process for implementing binary arrays, according to some embodiments.

Figure 1:
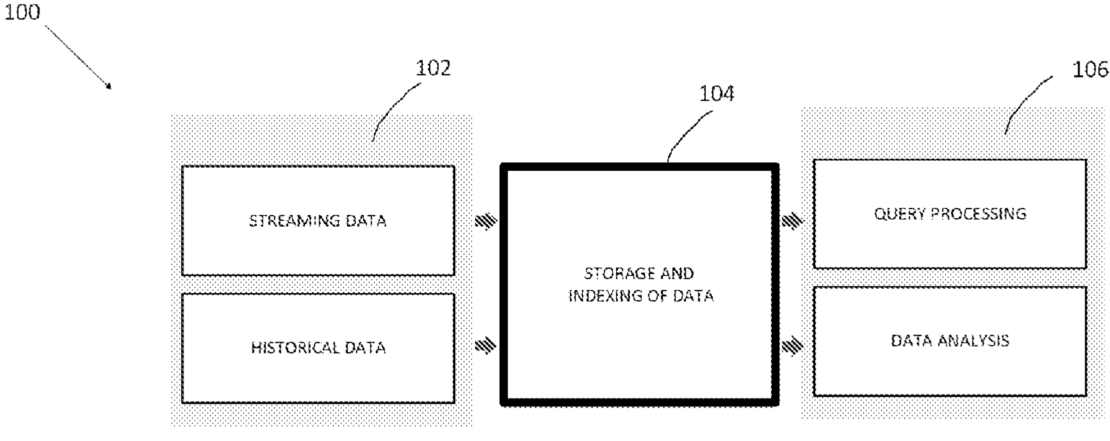
FIG. 1 is a block diagram illustrating the context of operation of the present invention.

The Figures described above are a representative set and are not an exhaustive with respect to embodying the invention.

DESCRIPTION

Disclosed are a system, method, and article of manufacture for implementing binary arrays. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

The following terminology is used in example embodiments:

Artificial neural network is based on a collection of connected units or nodes called artificial neurons. Each connection can transmit a signal to other neurons. An artificial neuron receives signals then processes them and can signal neurons connected to it. The signal at a connection is a real number, and the output of each neuron is computed by a specified non-linear function of the sum of its inputs. Neurons and edges can have a weight that adjusts as learning proceeds. The weight increases or decreases the strength of the signal at a connection. Neurons may have a threshold such that a signal is sent only if the aggregate signal crosses that threshold.

Word: {0, 1} words of length N; N is 8 or a multiple of 8 for typical byte-oriented machines. An example method is applicable to machines of any word size.

Binary Array: An array containing only 0s and 1s. In one example, a binary array, or code or codebook is runs of zeros and ones. For example, an image can be stored as a 2D binary array, with sets of 0s and 1s signifying RGB values. In one example, a binary array can be a collection of vectors of length 'n', where each vector has 0s and 1s as it's elements. In one example, a binary array can be a stream of 0s and 1s. A data stream of 0s and 1s can be video, text, image, program or raw binary blobs.

Segmenting: Partitioning based approach toward compression, normally constituting pattern-based tiling, re-ordering of datasets, etc.

Bit Chunking: Packing of codewords into 8, 31 or 63 bits with additional flag bits to indicate the type of codewords.

Symbol Fusion: Continuous strings of 1s or 0s followed by near-identical continuous strings of 1s or 0s, fused together into a symbol. Trains of such symbols (with intermittent gaps between them) are coded together into hyper-symbols.

Near Identical Marking: Differential encoding of near continuous strings of 0s and 1s by marking the distance between chains of 0s or 1s and almost similar chains of 0s or 1s with breaks between them.

Pareto Frontier: Pareto Frontier presents the feasible solutions found during the trade-off process between multiple objective functions.

Domain and Co-domain: A function from A to B is a rule that assigns to every element of A, a unique element in B. This can be termed as A the domain, and B the codomain, of the function.

Injective Function: A function is injective when no two elements from the domain of a function map to the same element in the Co-domain of the function.

$0^{\omega}$: a bit string comprising ω 0s. For example, $0^5$ is: 0 0 0 0 0.

$1^{\omega}$: a bit string comprising ω 1s. For example, $1^5$ is: 1 1 1 1 1.

$2^{p,\omega}$: a bit string of length ω with all 0s except for a 1 in position (p−1). It is assumed that $0 \le p \le \omega - 1$. For example, $2^{3,8}$=0 0 0 0 1 0 0 0.

Encoding for zero: $0^{\omega}$.

Encoding for one: Anything other than encoding for zero.

Dissolution coding: Encoding of data in terms of its constituents, their correlations among them and formulating functions that produce such constituents with such correlations. For example, a table can be dissolution coded in terms of its rows and column indices, along diagonal elements, etc. In another example, a run of zeros and ones can be lumped together, and dissolution coded as an integer values.

Access patterns: Regardless of the application domain, various challenges arise when designing data intensive systems. For example, applications must interact with multiple database products, user interfaces must conceal complex database semantics, the initialization of database resources is slow, data that is often accessed by applications must be cached, multiple users must have concurrent access to the same data, etc. Access patterns define generic solutions for addressing common design issues such as these and make it easy to maintain the systems. For example, they provide design and structure for effective cache management, concurrency control, etc.

These definitions are provided by way of example and not of limitation.

Example Systems and Methods

An example embodiment relates to a method and a system for efficient storage or transmission of a binary array, such that the cost of accessing the array is minimized. More particularly, one example embodiment relates to methods for coding and decoding a binary array on a computer system, and to a program (e.g. a machine executable code) located in a computer-readable medium comprising such coded binary array.

There exist a number of methods to compress binary arrays. Unlike the prior art, an example method does not rely on packing binary values into successive machine words (or chunks of 31 or 63 bits, etc.) with codewords. Instead, the binary array is represented by one or plurality of easily computable generating functions that are codified using a machine executable branch-free program. All prior art approaches lossy or lossless compression of binary arrays using some form of (or an approximation of) entropy coding. Be it Huffman coding, Range coding, Arithmetic coding, Asymmetric numeral systems (ANS), Context-adaptive binary arithmetic coding (CABAC), etc. or their derivative methods, all attempt to approach the optimal compression size (e.g. entropy of the binary array). Few algorithms/methods deviate from the goal of optimal size towards retrieval efficiency and bitwise AND, OR, XOR, etc. operation (performance) efficiency. An example embodiment views the data source (binary array) as the output of one or a plurality of generating functions, which it then codifies as a branch-free (loop-free) program for efficient compression and retrieval operations. Some exemplary generating functions and a method to infer such generating functions for any given input (binary or non-binary array) are also described in more detail later below. The generating functions may be codified as branch-free (loop-free) programs to obtain significant speedups.

Unlike the prior art, an example method, with trivial extensions, is applicable to non-binary arrays as well. One may optionally apply dissolution coding to the complement of a binary vector if it contains more ones than zeros or vice-versa. It is noted that a problem with prior art methods is that their algorithms are not optimized for various types of patterns (of 0s and 1s in the binary array).

For binary arrays that are amenable to efficient run length encoding and packing, few algorithms provide best results while most others fail to yield optimized output. Also, for such pattern-based algorithms, there is a need to reorder (pre-process) the columns and/or rows of the binary array for efficient packing.

An example method attains high memory throughput and faster retrieval by avoiding irregular memory access patterns altogether. An example method achieves this by dissoluting the binary array into one or a plurality of generating functions, that is then transformed into a branch-free (loop-less) code (machine executable program) taking advantage of the instruction cache. This design of an example embodiment helps minimize cache misses, decreases latency of instructions, minimizes memory requirements, optimizes access time and increases performance of the applications operating on data values.

FIG. 1 illustrates a typical operational context 104 of present invention. Any data (e.g. streaming or historical) 102, after being captured is stored and/or indexed 104 for subsequent analysis, transmission and/or querying 106. It is imperative that the data be implemented in such a way to achieve increased performance in indexing, efficient storage (with very low retrieval and processing times) and reduced transmission bandwidth and latencies. 104 may index new data and compress it to reduce memory requirements. During a typical querying process, the index is looked into, and corresponding results are returned. During a typical data analysis process, various portions of binary array are fetched from memory, usually in a random-access fashion. It may also be the case that all the functional components 102, 104 and 106 reside on a single computer, a cluster of computers connected via internet or distributed across various IoT devices.

Figure 2:
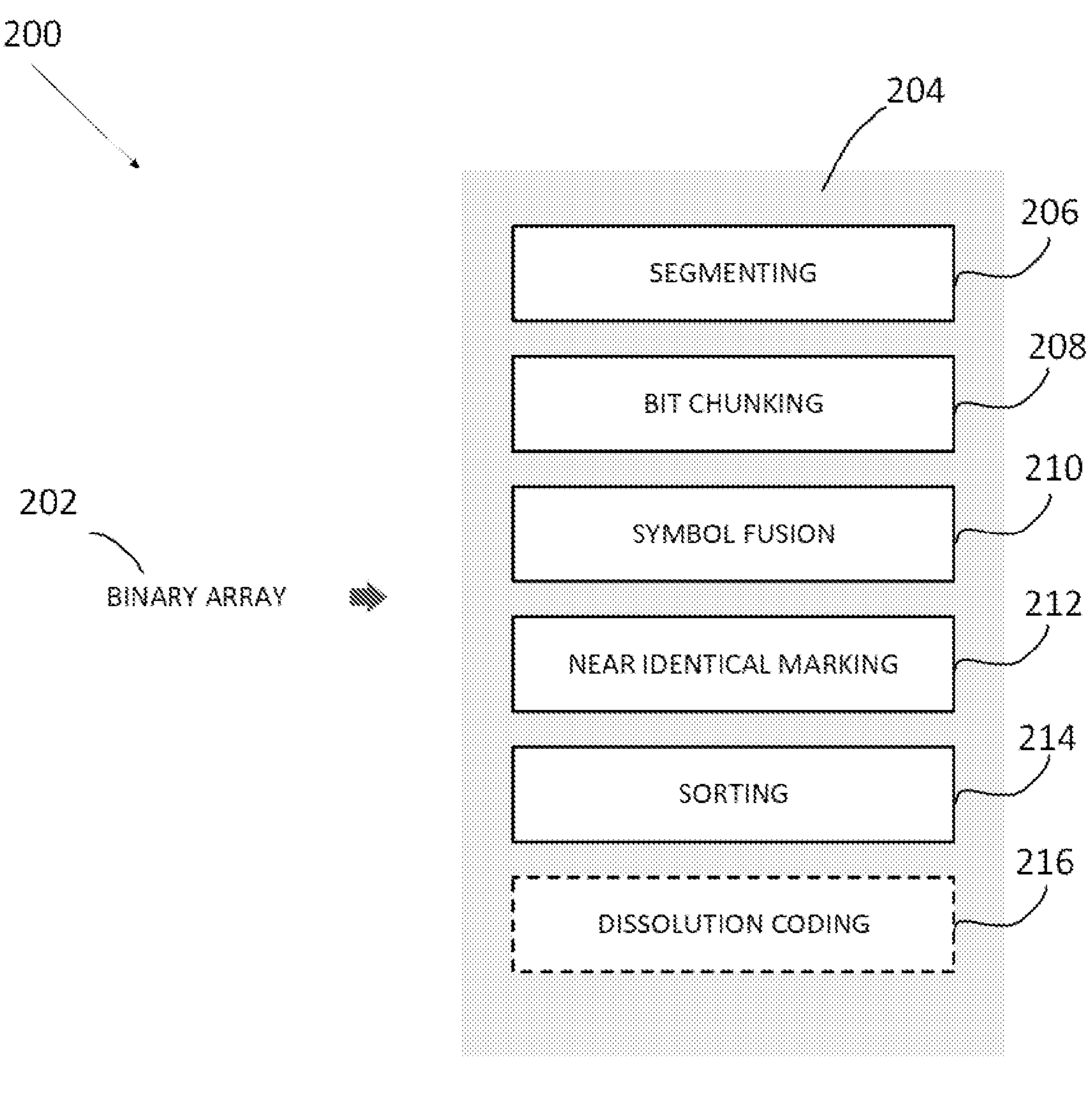
FIG. 2 is a block diagram outlining the prior art in binary array compression technology.
Figure 3:
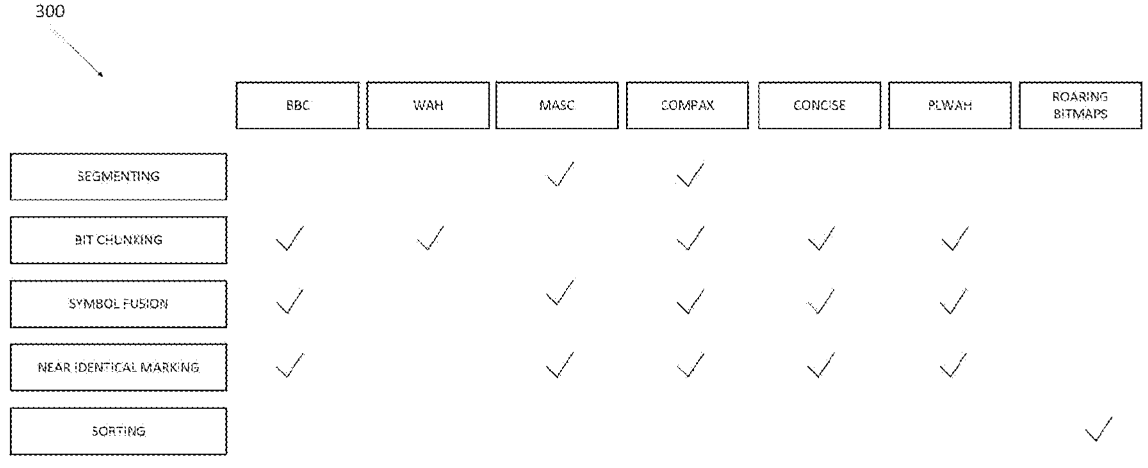
FIG. 3 is a table illustrating various methods employing techniques from the prior art in binary array compression technology.

FIGS. 2 and 3 present an overview of the present state of art techniques for binary array compression. Binary array compression methods can be broadly characterized according to various techniques they employ such as bit chunking, segmenting, symbol fusion, sorting and near identical marking.

Figure 4:
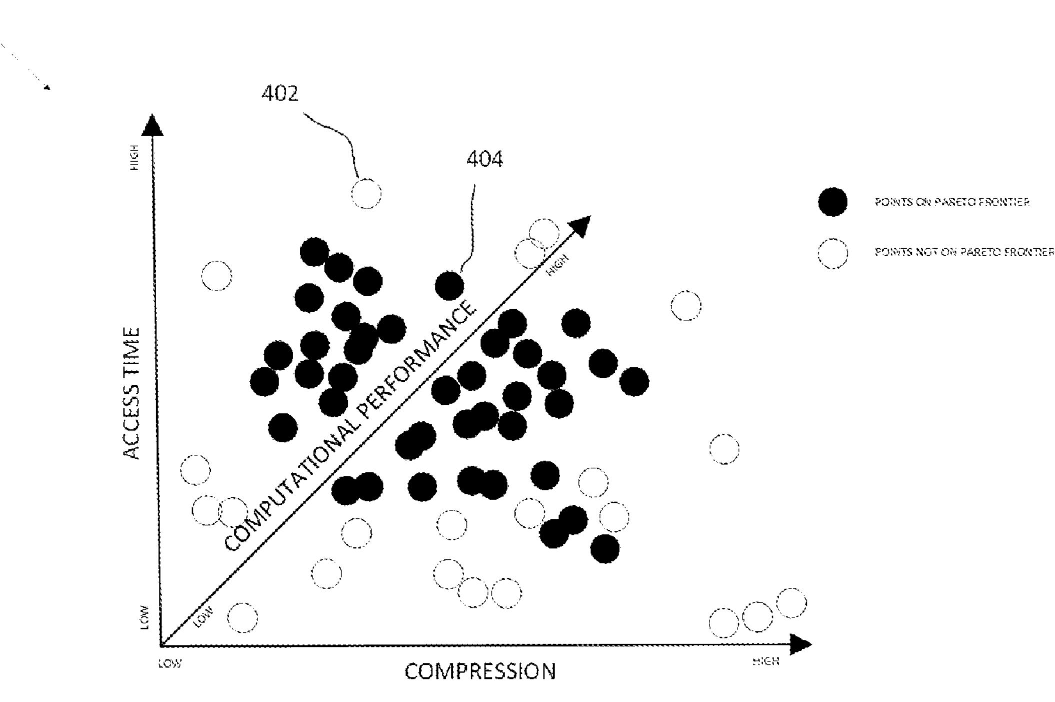
FIG. 4 is a diagram illustrating the Pareto Frontier of various embodiments of binary array compression methods.

The present method takes into consideration several different objectives of interest such as ease of computability, achieving high memory throughput, maximal utilization of processor cache-lines and instruction caches, etc. Considering the three dimensions to be representative of the three major conflicting objectives (FIG. 4): good compression and storage efficiency; ease of access and small retrieval times; and amenability for high performance computations, an example method optimizes for the objectives using a Pareto Frontier.

The Pareto Frontier (space denoted by black colored points 404) is defined by the three objectives. Each dot of type 404 or 402 can be regarded as a binary array compression method that makes some kind of a trade-off between the three objectives. Each dot may employ some combination of the binary array compression techniques (FIGS. 2 and 3) to become a part of the Pareto Frontier.

An example embodiment adds another technique to the arsenal of such binary array compression techniques to enable better performance and storage optimization. The dissolution coding aspect of an example embodiment contributes to better access times and efficient storage requirements, while simultaneously contributing to better performance and memory throughput through its subsequent codification as a branch-free (e.g. loop-free) program.

Figure 5:
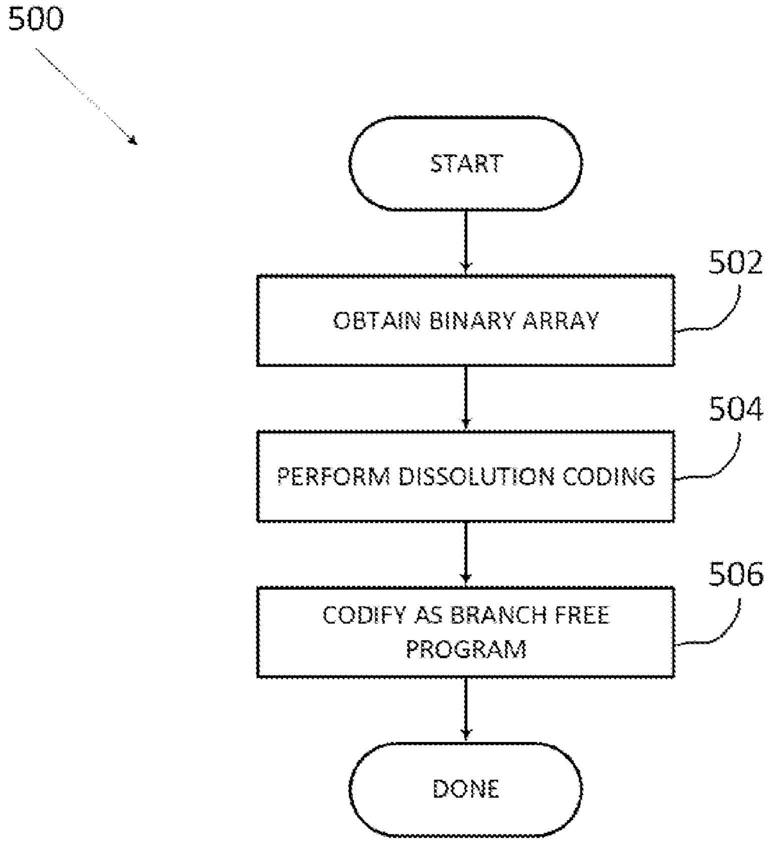
FIG. 5 is a flowchart illustrating the overall operation of the present invention.

FIG. 5 depicts the flowchart of the overall operation of present invention. First, the binary array is obtained 502 for subsequent operations to be performed upon. Optionally, one or a plurality of transformation or pre-processing steps (e.g. like row or column reordering, complementing the values of 1s and 0s, etc.) may be applied to the binary array at this stage based upon the observed or anticipated or designed access patterns of the binary array. The subsequent operations can include, inter alia: fast data transmission (e.g. streaming, etc.); compilers and parsers; compact representations of neural networks; etc. Other examples are provided elsewhere herein.

Figure 6:
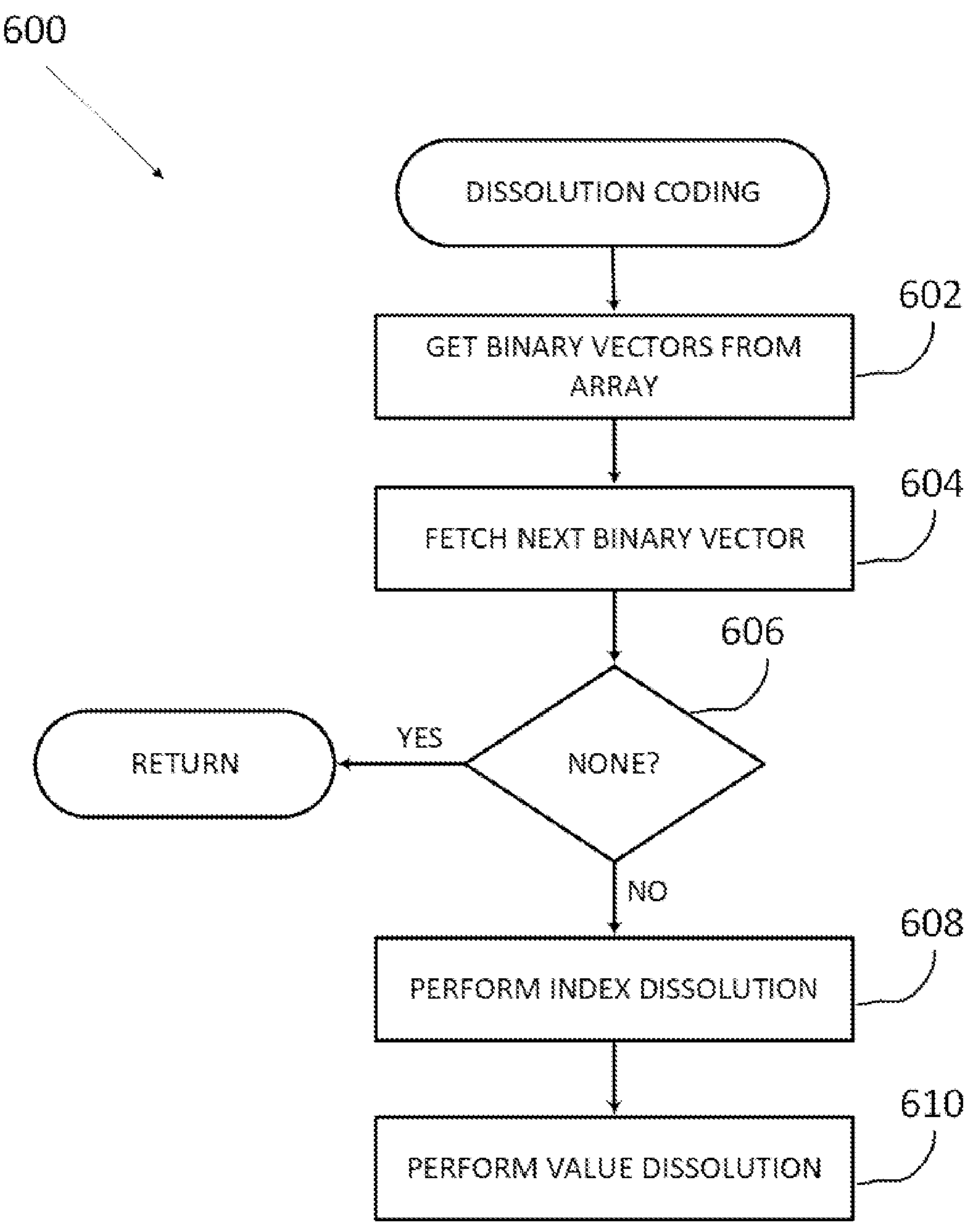
FIG. 6 is a flowchart illustrating a suboperation of the present invention.

Second, the dissolution coding is performed on the binary array 504 to yield single or a plurality of generating functions. The steps involved in this stage are illustrated in FIG. 6 and are described below in detail. Third, the output from step 504 is codified as a branch-free (loop-free) program 506 to yield an optimal packing of the binary array that optimizes for efficient storage requirements, better computational performance and fast access times.

FIG. 6 depicts the flowchart of the dissolution encoding step 504. In step 602, $\{0, 1\}$ bit strings of length N are extracted. For each $\{0, 1\}$ bitstring of length N 604, index dissolution 608 and value dissolution 610 steps are performed. When there is no $\{0, 1\}$ bit string left to be processed 606, the routine returns back control to perform step 506.

Figure 7:
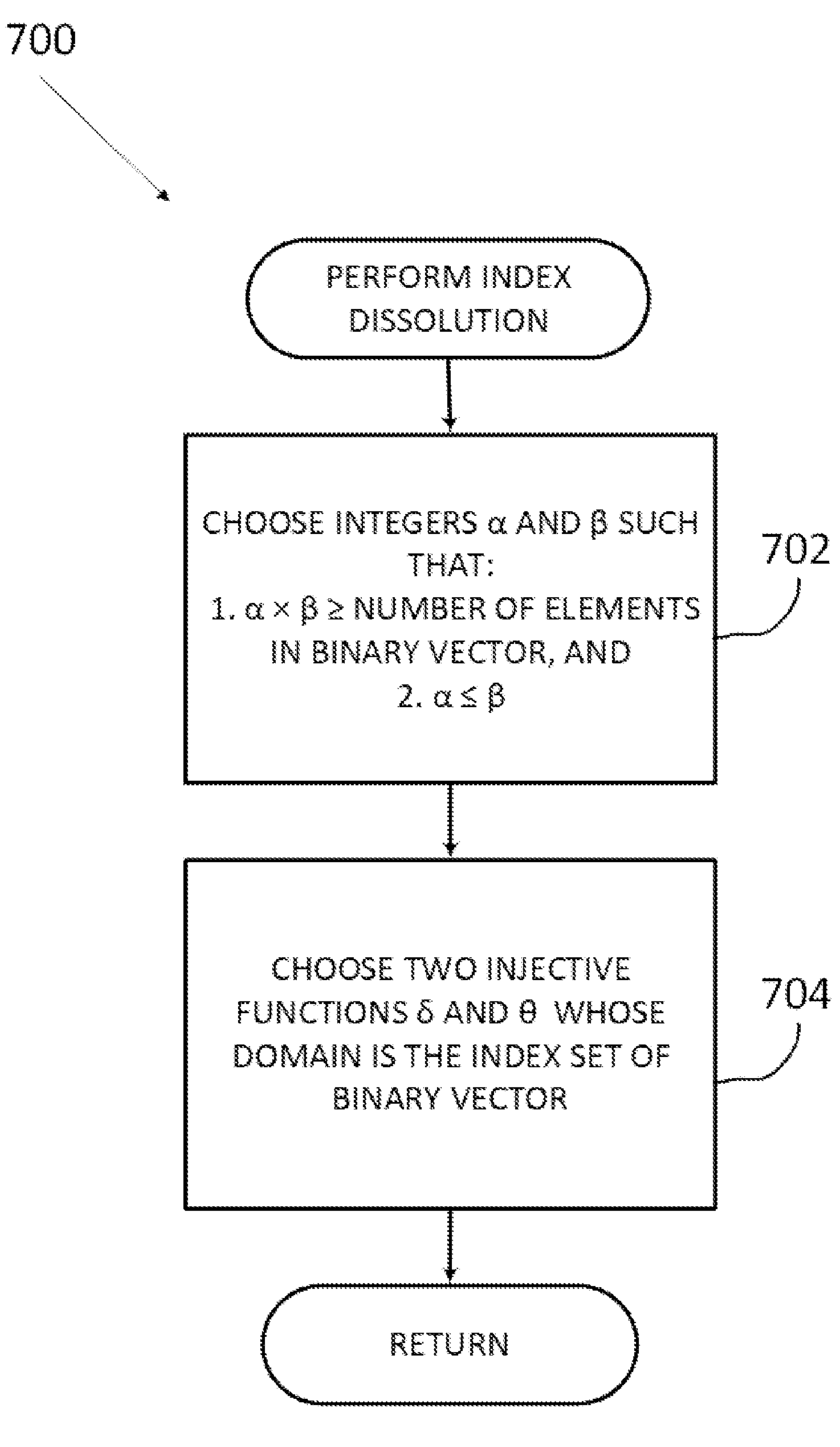
FIG. 7 is a flowchart illustrating a suboperation of the present invention.
Figure 8:
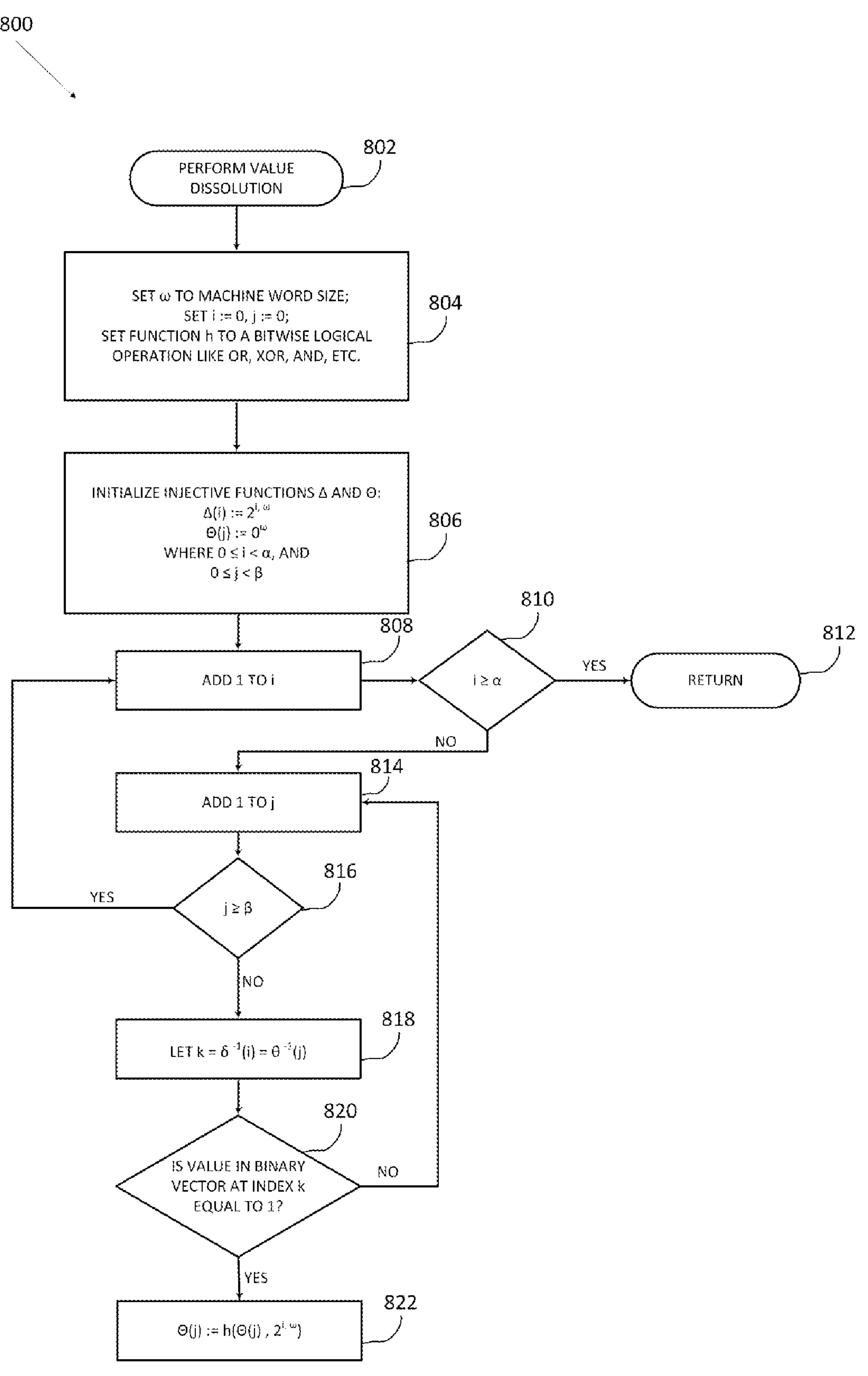
FIG. 8 is a flowchart illustrating a suboperation of the present invention.
Figure 10:
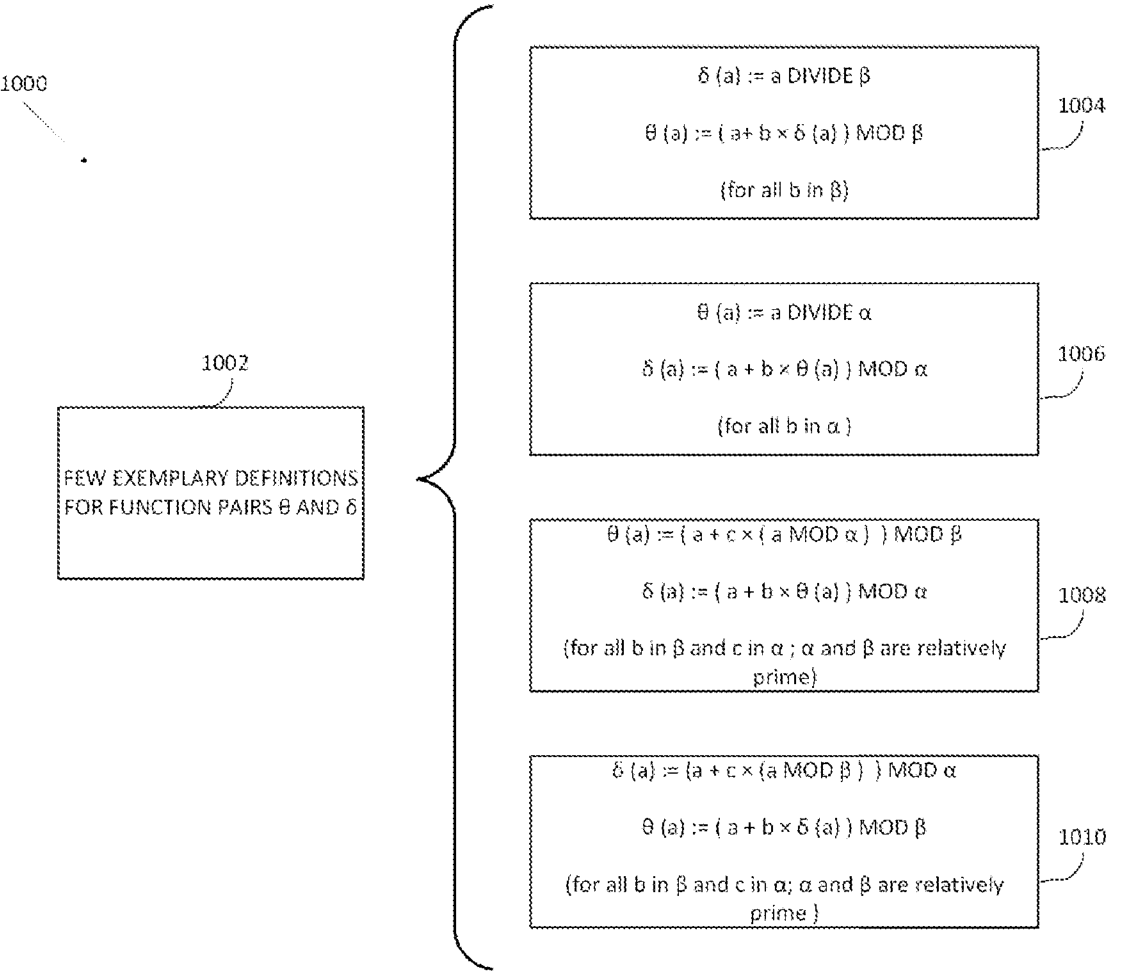
FIG. 10 is a block diagram illustrating few exemplary definitions for injective function pairs of parametric division and modular arithmetic nature.

FIGS. 7 and 8 depict flowcharts for steps 608 and 610 respectively. Index dissolution is illustrated by the flowchart in FIG. 7 where step 702 corresponds to choosing two integer values $\alpha$ and $\beta$ such that $\alpha\times\beta$ is at-least equal to or greater than N. And additionally, $\alpha$ be less than or equal to $\beta$. Step 704 corresponds to choosing two injective functions $\delta$ and $\theta$. Some exemplary definitions 1002 for 6 and 0 are illustrated in FIG. 10. Each of the definitions 1004, 1006, 1008 or 1010 is taken from a set of few possible easily computable modular and divisional arithmetic functions, parametrized by $\alpha$ and $\beta$. It can be assumed that $\omega$ can be 8 (or 16 or 32 or 64 or any other multiple of 8) for a byte-oriented machine and length of the $\{0, 1\}$ bit string being processed to be N in the description. However, an example method is equally applicable for various other values of $\omega$ without compromising in its efficacy.

Value dissolution is illustrated by the flowchart in FIG. 8 which returns two generating functions $\Delta$ and $\Theta$ whose domains are $\alpha$ and $\beta$ respectively 812. Step 804 is the initialization step which sets $\omega$ to the machine word size (8 or a multiple of 8) and a bitwise function h is chosen. Few examples of such functions for h are AND, OR, XOR, etc. The value for $\omega$ to be 8 or a multiple thereof is only chosen for illustrative purposes on byte-oriented machines. method is parameterized on $\omega$. Hence, an example method works equally well for any suitable value of $\omega$ (i.e., less than or greater than 8 or a multiple thereof) based on the underlying machine architecture. Various heuristics may also be employed to estimate an optimal value for w. Step 806 initializes $\Theta(j)$ to bit strings of all 0s for every j such that $0 \le j < \beta$, and $\Delta(i)$ to a bit string of length $\omega$ with all 0s except for a 1 in position i for every I such that 0 j<$\alpha$. For each i, starting with i=0 step 1 808, For each j, starting with j=0 step 1 814, if the value at binary vector at index k (where $k=\delta^{-1}(i)=\theta^{-1}(j)$ 818) has value 1 820, then update the value of $\Theta(j)$ to $\Theta(j)=h(\Theta(j), 2^{i,\omega})$ 822. If the value of i exceeds or equals $\alpha$ 810, the subroutine returns back control 812.

After finishing step 504, there can be the two functions $\Delta$ and $\Theta$. The total amount of memory required to store a $\{0, 1\}$ bit string of length N and a being equal to $\omega$ is: $(\omega+N/\omega)$ bits.

This requirement can be further reduced thus: The injective function values of $\delta$ and $\theta$ for every index k (where $0 \le k < N$) need not be stored. To maximize storage efficiency, process 500 can just calculate their values for a given k at runtime. The function values of $\Delta$ for every i (where $0 \le i < \alpha$) also need not be stored and can be computed on the fly at runtime. Only the values of function $\Theta$ need to be stored. And to optimize its storage efficiency, various pointers (memory addresses) may be utilized to point to same function values. For step 506, process 500 can have a dissolution coding of the large binary array in the form of functions $\delta$, $\theta$, $\Delta$ and $\Theta$. The computations involved in these functions can be represented as a branch-free (loop-free) program (machine executable code) to improve memory access locality.

Figure 9:
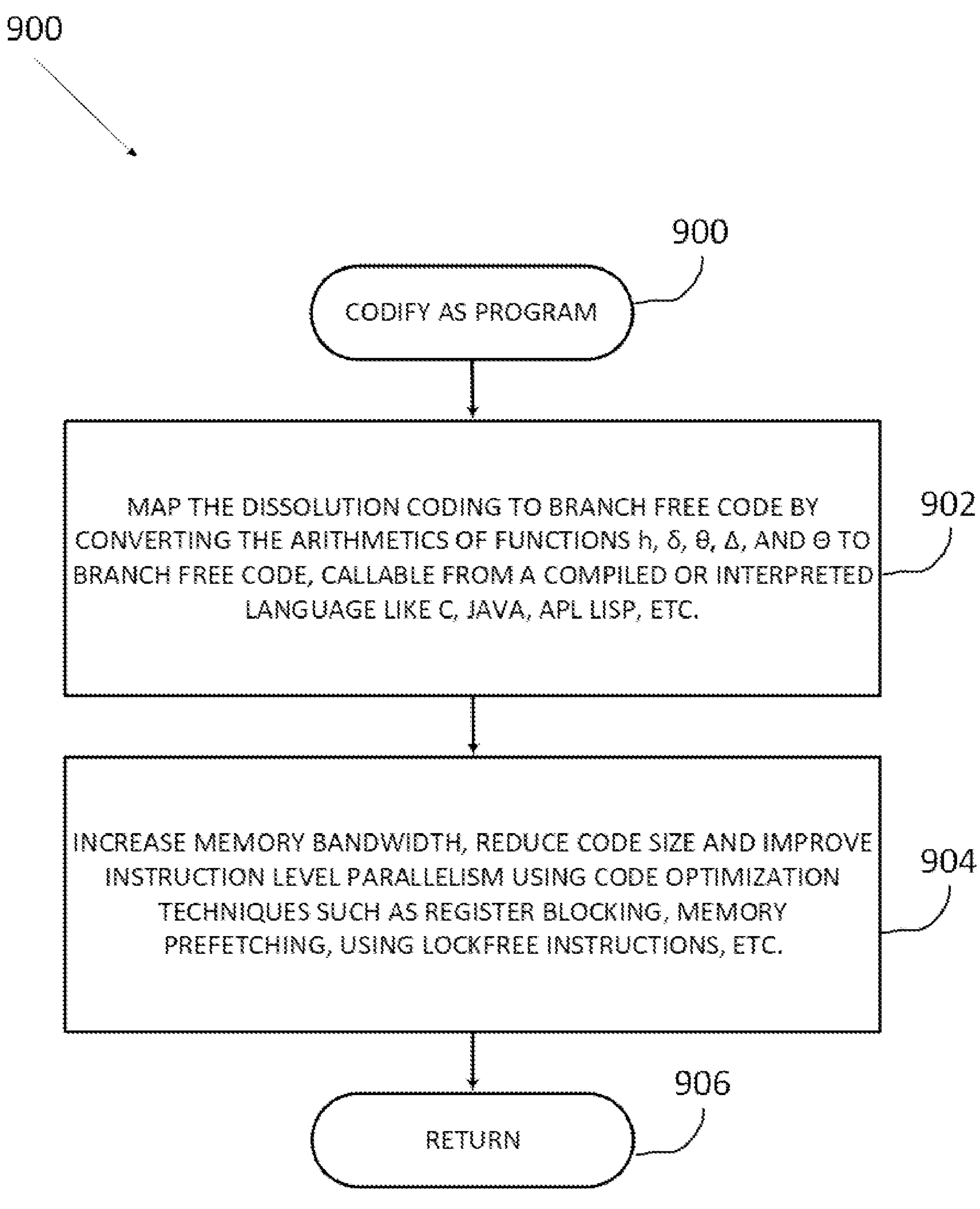
FIG. 9 is a flowchart illustrating a suboperation of the present invention.

The sub-steps involved in 506 is depicted in the flowchart as shown in FIG. 9. Given a large binary array, step 504 achieved to represent the array using generating (or dissolution) functions $\delta$, $\theta$, $\Delta$ and $\Theta$. Step 506 helps us utilize the data cache as well as instruction cache on processor cores more effectively by transforming the dissolution (or generating) functions into machine executable instructions. A mapping of the dissolution (or generating) functions $\delta$, $\theta$, $\Delta$ and $\Theta$ by converting the arithmetics of these functions into branch-free (loop-free) instructions 902. In x86_64 architecture for example, assuming ROI as destination register and RSI as source register, process 900 can use series of MOV, XOR, STOSD for fetching values from stack, setting 32-bit registers (EAX, etc.) with value displacements, and storing the result (0 or 1) into the output binary vector (during access). The code size can be further reduced using register blocking techniques, using 32-bit registers whenever possible, prefetching instructions and using instructions like MOVNTI to void cache line pollution 904. This enables optimal L1 cache (both data and instruction) usage by an example method. With modern processors having very complex mechanisms to avoid pipeline stalling because of branching mispredictions, etc., An example method piggybacks on processors' implicit instruction prefetching for high performance and memory throughput. Unlike other compression methods (prior art) that leave at least half of the L1 cache unused (e.g. instruction cache), this step 506 additionally adds orders of magnitude gain in performance and compression efficiency.

FIG. 12 illustrates the memory layout of a typical computer with four processor cores. Each core 1210 has its own L1 data 1206 and instruction caches 1208, in addition to slower L2 caches 1204. All cores share a much slower L3 cache 1212 which pipelines with DRAM 1202 that is hundreds of times slower than the lower-level caches. An L2 cache reference is approximately 20 times slower than an L1 cache reference. And a DRAM reference is approximately 200 times slower than L1 cache reference.

Figure 11:
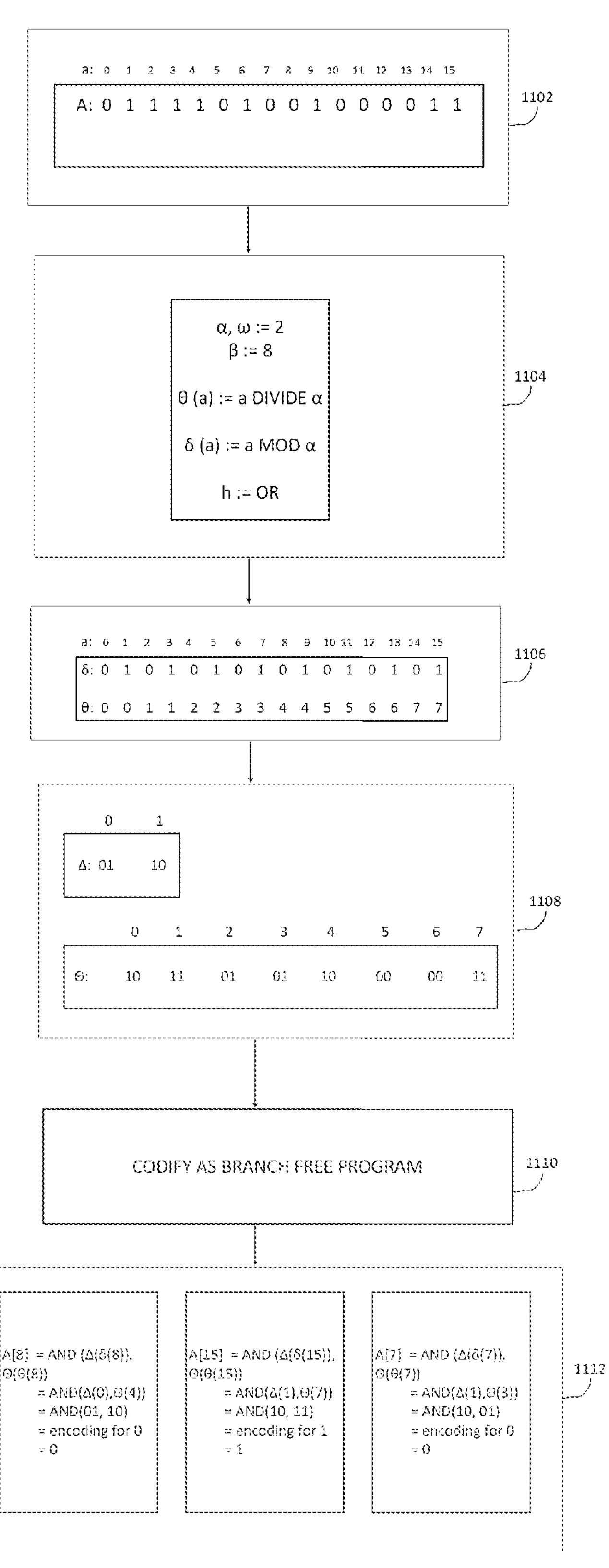
FIG. 11 is a block diagram illustrating a sample run (operation) of the proposed invention on a given input data set.

FIG. 11 shows an example run of performing dissolution coding 504 (e.g. of FIG. 5) on a given binary array A of length 16 1102. The array elements are indexed 0 through 15. 1104 is the result of choosing a specific function definition pair from 1006 (e.g. see FIG. 10) and setting h to be bitwise OR function. Iterating across all the values of the index of the binary array, process 1100 obtain the function values for 6 and 0 as shown in table 1106. After proceeding through step 504 (e.g. see FIG. 5), the values can be obtained for the dissolution functions $\Delta$ and $\Theta$ as shown in 1108. 1110 is codification of the dissolution functions into a branch-free (loop-less) program, and 1112 shows a few random accesses for values at indices 8, 15 and 7 respectively. Upon application of AND function between value pair obtained from the dissolution (generating) function values $\Delta$ and $\Theta$ for the corresponding indices, the value at the desired index can be obtained. For example, to obtain value of A at index 7, the values of 6 and $\theta$ at 7 are obtained first: $\delta(7)=1$ and $\theta(7)=3$. Second, Values of dissolution functions $\Delta$ and $\Theta$ are obtained at 1 and 3 respectively: $\Delta(1)=10$ and $\Theta(3)=01$. Third, AND is applied between 10 and 01. That is, 10 AND 01=00=encoding for 0. Hence, the value of A at index 7 is 0.

According to an alternative embodiment of the present invention, dissolution coding and subsequent codification as a branch-free (loop-free) program may be applied to the complement of a binary array, if it contains more ones than zeros or vice-versa.

According to another alternative embodiment of the present invention, dissolution coding and subsequent codification as a branch-free (loop-free) program may be applied to various transformations of a binary array such as transposition, multiplication by a scalar, transforming binary array into stream of binary values, etc., in accordance with operating routines, heuristics and other data access patterns.

According to another alternative embodiment of the present invention, dissolution coding and subsequent codification as a branch-free (loop-free) program may be applied to non-binary arrays. One such exemplary embodiment is presented in FIG. 13. For a non-binary vector of length N with M distinct values 1302, each of the M values is encoded using LOG(M)/LOG(2) bits 1304. Setting $\omega$ to a specific word size, suitable values for integers $\alpha$ and $\beta$ are calculated 1306. Regarding the given nonbinary vector now to be a matrix of N rows and LOG(M)/LOG(2) columns 1308, each column is dissolution coded independently 1310. Each block of $\alpha$ bits in a string length of $\omega$, represented by their respective dissolution functions ($\Delta$ and $\Theta$), are codified into branch-free (loop-free) programs 1312. Various alternatives exist to this mechanism: the matrix may be structured in other suitable ways before performing dissolution coding.

According to another alternative embodiment of the present invention, dissolution coding may employ functions $\theta$ and $\delta$ (e.g. from FIG. 10) that are not necessarily distinct and easily computable.

According to another alternative embodiment of the present invention, dissolution coding may employ functions $\theta$ and $\delta$ (e.g. from FIG. 10) that are not necessarily distinct and easily computable and may be related to division arithmetic functions, modular arithmetic functions, etc.

According to another alternative embodiment of the present invention, the function values θ, δ, h, Δ and Θ may all be stored as look-up tables. Alternately, θ, δ, h, Δ and Θ may all be stored as symbolic functions. Alternately, some functions among θ, δ, h, Δ and Θ may be stored as look-up tables and others as symbolic functions.

According to another alternative embodiment of the present invention, dissolution coding and subsequent codification as a branch-free (loop-free) program may be recursively applied to outputs of previous applications of dissolution coding on data values.

According to another alternative embodiment of the present invention, dissolution coding and subsequent codification as a branch-free (loop-free) program may be applied in combination with other known compression techniques like bit chunking, byte alignment, segmenting, sorting, etc. for enhancing specialized operations.

According to another alternative embodiment of the present invention, dissolution coding and subsequent codification as a branch-free (loop-free) program may be applied in a divide-and-conquer style on various fragments (tiles or regions, etc.) of data values (binary or non-binary arrays) which may be pre-processed for efficient computation (e.g., rows and columns of binary array may be rearranged to suit a specific pattern before applying dissolution coding, etc.) and other data structuring of binary arrays guided by heuristics.

FIG. 14 illustrates an example process 1400 for implementing binary arrays, according to some embodiments. In step 1402, process 1400 can reduce the cost of accessing binary arrays (vectors, lists, matrices, etc.). In step 1404, process 1400 can provide efficient representation of binary arrays (vectors, lists, matrices, etc.) consuming less memory bandwidth.

In step 1406, process 1400 can provide efficient representation of binary arrays (vectors, lists, matrices, etc.) that can efficiently perform bitwise logical operations like AND, OR, XOR, etc., even in machines whose computer organization doesn't efficiently allow random bit addressing.

In step 1408, process 1400 can avoid expensive preprocessing on large binary arrays (vectors, lists, matrices, etc.) for efficient compression. In step 1410, process 1400 can maximize memory throughput in expensive calculations involving large binary arrays (vectors, lists, matrices, etc.).

In step 1412, process 1400 can provide a memory, time and compute efficient binary array (vectors, lists, matrices, etc.) representation for low-end or embedded processors. In step 1414, process 1400 can provide a representation for binary arrays (vectors, lists, matrices, etc.) that is amenable for efficient distributed or parallel computing.

In step 1416, process 1400 can provide an easily extendible efficient representation method that is also applicable to non-binary arrays (vectors, lists, matrices, etc.). In step 1418, process 1400 can enable binary array to be used in combination with existing compression techniques.

Additional Computing Systems

Figure 15:
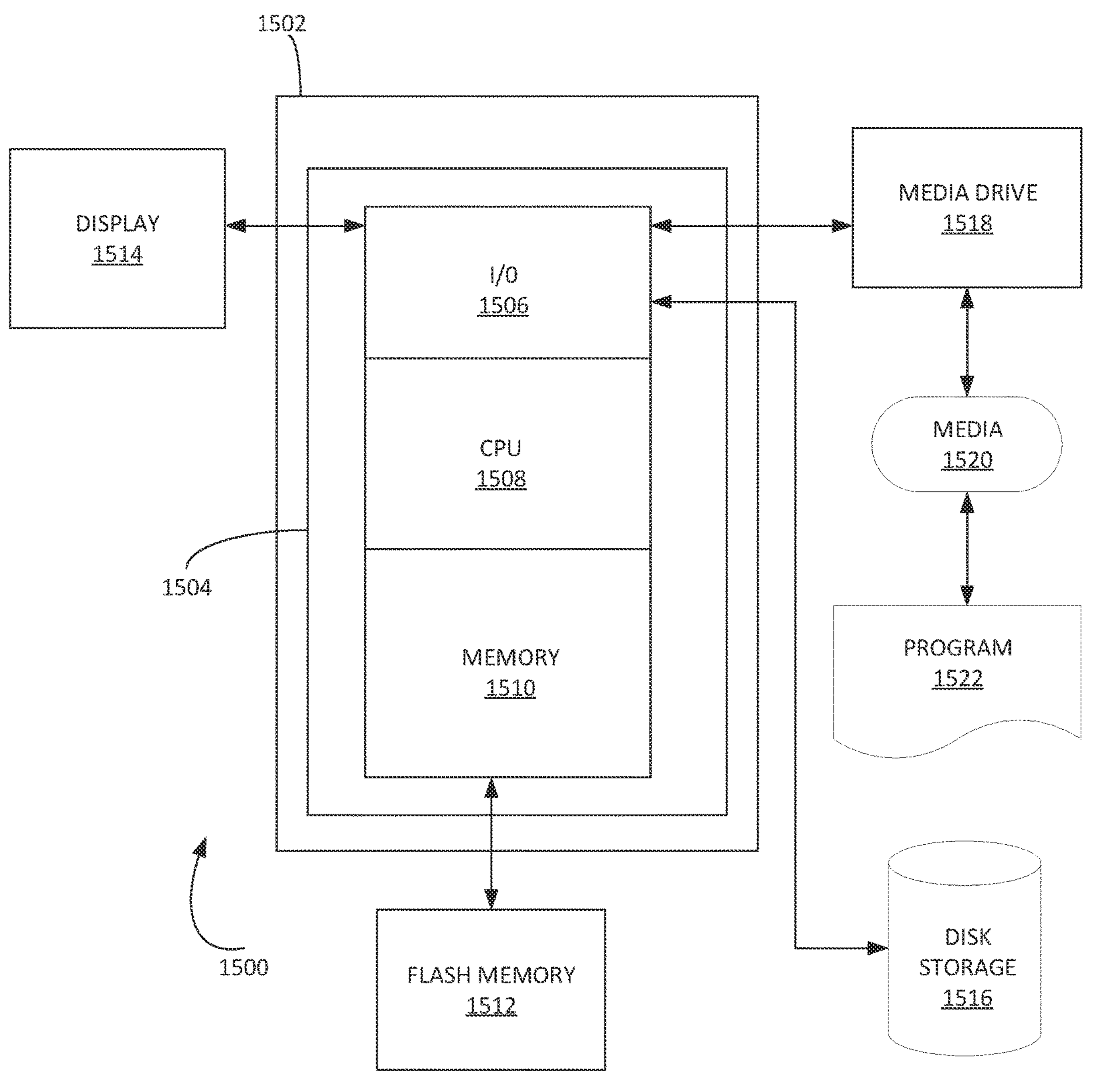
FIG. 15 depicts an exemplary computing system that can be configured to perform any one of the processes provided herein.

FIG. 15 depicts an exemplary computing system 1500 that can be configured to perform any one of the processes provided herein. In this context, computing system 1500 may include, for example, a processor, memory, storage, and I/O devices (e.g., monitor, keyboard, disk drive, Internet connection, etc.). However, computing system 1500 may include circuitry or other specialized hardware for carrying out some or all aspects of the processes. In some operational settings, computing system 1500 may be configured as a system that includes one or more units, each of which is configured to carry out some aspects of the processes either in software, hardware, or some combination thereof.

FIG. 15 depicts computing system 1500 with a number of components that may be used to perform any of the processes described herein. The main system 1502 includes a motherboard 1504 having an I/O section 1506, one or more central processing units (CPU) 1508 and/or graphical processing unit (GPU), and a memory section 1510, which may have a flash memory card 1512 related to it. The I/O section 1506 can be connected to a display 1514, a keyboard and/or another user input (not shown), a disk storage unit 1516, and a media drive unit 1518. The media drive unit 1518 can read/write a computer-readable medium 1520, which can contain programs 1522 and/or databases. Computing system 1500 can include a web browser. Moreover, it is noted that computing system 1500 can be configured to include additional systems in order to fulfill various functionalities. Computing system 1500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method comprising:

with at least one computer processor;

obtaining a binary array, wherein the binary array is utilized for a subsequent set of operations;

performing a dissolution coding on the binary array to yield a one or more generating functions; and generating, by a code generator, an executable instruction sequence comprising a fixed number of machine instructions without conditional branches, the executable instruction sequence being configured to retrieve values from the binary array when executed by a processor, wherein executing the executable instruction sequence retrieves values from the binary array while reducing cache-line fetches or memory traffic relative to a word-packed bitmap representation, wherein the executable instruction sequence stores only a subset of the generating function values, and remaining values are computed at runtime by executing the executable instruction sequence without reconstructing the binary array, wherein the executable instruction sequence is configured to reside in an instruction cache of the processor and to be executed using implicit instruction prefetching, and wherein values of the binary array are retrieved at runtime by executing the executable instruction sequence without reconstructing or materializing the binary array in memory.

2. The computerized method of claim 1, wherein a plurality of transformation operations is applied to the binary array on a set of designed access patterns of the binary array.

3. The computerized method of claim 2, wherein a plurality of pre-processing operations is applied to the binary array on the set of designed access patterns of the binary array.

4. The computerized method of claim 3, wherein a plurality of pre-processing operations comprises a row or column reordering operations and a complementing the values of 1s and 0s operations.

5. The computerized method of claim 1, wherein the step of performing the dissolution coding on the binary array to yield one or more generating functions further comprises: extracting a set of {0, 1} bit strings of length N.

6. The computerized method of claim 5, wherein or each {0, 1} bitstring of length N, an index dissolution is performed.

7. The computerized method of claim 6, wherein or each {0, 1} bitstring of length N, a value dissolution is performed.

8. The computerized method of claim 7, wherein it is detected that there is no {0, 1} bit string left to be processed, and a routine returns back control to codify the one or more generating functions as a branch-free program to yield the optimal packing of the binary array.

9. The computerized method of claim 1, wherein there are two functions 4 and Θ.

10. The computerized method of claim 9, wherein a total amount of memory is utilized to store the {0, 1} bit string of the length N and an being equal to ω is: (ω+N/ω) bits.

11. The computerized method of claim 10, wherein a dissolution coding of the large binary array is provided in the form of the generating functions δ, θ, Δ and Θ.

12. The computerized method of claim 11, wherein a plurality of computations involved in the one or more generating functions are represented as a loop-free machine executable code for memory access locality.

13. The computerized method of claim 12, wherein given a binary array, the binary array is representing using the generating functions δ, θ, Δ and Θ.

14. The computerized method of claim 13, wherein a data cache is used an instruction cache on one or more processor cores by transforming the generating functions into the machine executable instructions.

15. The computerized method of claim 14, the generating functions δ, θ, Δ and Θ by converting a plurality of arithmetics of the generating functions δ, θ, Δ and Θ into a branch-free instruction or a loop-free instruction.

16. The computerized method of claim 15, wherein the code size is further reduced using a register blocking technique, using a 32-bit registers, and using a set of pre-fetched instructions to void a cache line pollution.

17. The computerized method of claim 16, wherein the binary array optimizes for efficient storage requirements, better computational performance and fast access times.

18. The computerized method of claim 17, wherein the binary array binary array comprises a collection of vectors of length 'n', where each vector has 0s and 1s as it's elements.

19. The computerized method of claim 18, wherein the subsequent set of operations comprises a data streaming transmission.

20. The computerized method of claim 18, wherein the subsequent set of operations comprises a compact representation of an artificial neural network.

* * * * *